UNITED STATES PATENT OFFICE.

EDWARD T. PELTON, OF CHICAGO, ILLINOIS, ASSIGNOR, BY MESNE ASSIGNMENTS, TO AMERICAN SUPER-STEEL CORPORATION, A CORPORATION OF DELAWARE.

PROCESS OF MAKING STEEL.

1,315,034.     Specification of Letters Patent.     Patented Sept. 2, 1919.

No Drawing.     Application filed November 4, 1918. Serial No. 260,936.

*To all whom it may concern:*

Be it known that I, EDWARD T. PELTON, a citizen of the United States, residing at Chicago, in the county of Cook and State of Illinois, have invented certain new and useful Improvements in Processes of Making Steel, of which the following is a specification.

The process of the present invention has for its object to produce a steel of finer texture and having more perfect physical properties than steel produced in accordance with the usual and well known methods, without, however, materially increasing the cost of production and without requiring the addition of expensive metallic alloys of the kind ordinarily employed at the present time in the production of the higher grades of steel.

The process of the present invention conforms in certain of its initiatory stages to the standard practice, but continues the refining process to a final stage which, in conjunction with the preceding stages, results in a product which is physically superior to steel of the ordinary character.

In describing the steps by which the results above set forth are attained, it is the intention to specify proportions of the ingredients and the details of the process with sufficient particularity to enable one skilled in the art to practice the invention, but it is recognized that these proportions and details may be modified within reasonable limits, and it is not, therefore, the intention to confine the claims to the precise proportions and details set forth, unless otherwise specified.

The proportions and figures hereinafter to be given relate to the proportion per ton of two thousand pounds of iron material used in the original charge, which iron material may be furnished by scrap materials or from ore or pig iron, or from any desired mixture of any or all of these ingredients.

In the first stage, which involves the reduction or initial deoxidation of the iron, an electric furnace is charged with approximately one hundred pounds of dehydrated lime and approximately one hundred pounds of carbon per ton of iron ore, pig iron, scrap iron, scrap steel, or a mixture of any or all of these ingredients. The carbon is preferably in the form of ground charcoal, ground coke, or ground carbon electrodes, although other materials of a like nature may be substituted in lieu thereof. The furnace may be charged hot or cold, and the lime and carbon constituents may be varied considerably in volume either way without deleterious effects.

A reducing temperature is then produced in the furnace, and it is preferred to bring the furnace as quickly as possible to a high temperature, thereby producing a rapid reduction which lessens the loss of iron by oxidation. Although a lower temperature can be used for reducing the charge, the temperature and rapid reduction result in an iron loss of ordinarily not more than two or three per cent. To further lessen the loss by oxidation, the furnace should be as nearly as possible hermetically sealed to exclude atmospheric oxygen. When the charge has been brought to a thoroughly fluid condition, the current is turned off and the slag withdrawn. The principal purpose of this first step in the operation is to remove phosphorus which is largely carried off in the slag.

The second stage in the process is designed for the removal of sulfur from the charge. While the mass is still in a molten condition, the current is turned on, and approximately ten pounds of finely pulverized fluor-spar is added. After a thorough mixing of the fluor-spar the temperature of the furnace is maintained for from three to six minutes, after which approximately ten pounds of dehydrated lime is added. After the fluor-spar and dehydrated lime have formed what is commonly known as a carbid slag, the current is turned off and the slag withdrawn, which results in the removal of most of the sulfur.

The third stage is the further refining of the metal in the charge. After the current is again turned on approximately forty pounds of metallic ore or concentrates of ore, or any combination of ores or concentrate of ores, such as manganese ore, cobalt ore, chromium ore, vanadium ore, tungsten ore, or the like, are added. The molten mass is then thoroughly poled and the metal allowed to come to a high state of ebullition. When this ebullition has subsided the metal is withdrawn from the electric furnace. The principal purpose of this third stage in the operation is to refine the steel and improve its quality, fineness and tensile strength to greater degree than was possessed by the mass at the conclusion of the first two stages of the operation.

The addition of the ore or ores mentioned tends, after the ebullition, to form a coating or blanket on top of the metallic bath, which apparently has the effect of retaining the heat and preventing an access of atmospheric air, and it is believed that these conditions tend to produce the refining action to which the bath is subjected. The resulting steel possesses, in considerable degree, the physical properties of the high grade alloy steels, such as manganese steel, tungsten steel, or the like, without, necessarily, exhibiting any or more than a trace of such alloying materials when subjected to chemical analysis. Steel produced as a result of this third stage in the refining process possesses physical characteristics which have heretofore been considered impossible of securing in a steel having the chemical analysis of that produced by the process set forth above. By the process of discovery of the present invention great economy is effected in the materials used in connection with the charge of ferro alloys in comparison with the use of metallic alloys of the character employed at the present time, and which are extremely costly and add very greatly to the cost of production of the various high grade steels at present on the market.

I claim:

1. The process of producing steel which consists in charging a furnace with iron materials, adding to the charge materials adapted to unite with the phosphorus to produce slag, subjecting the charge to a reducing heat, removing the phosphorus slag from the charge, adding to the charge materials adapted to unite with sulfur to form a sulfur slag, removing the sulfur slag from the charge, adding metallic ore to the charge, causing ebullition in the charge, and withdrawing the charge from the furnace.

2. The process of producing steel which consists in charging a furnace with iron materials, adding to the charge materials adapted to unite with the phosphorus to produce slag, subjecting the charge to a reducing heat, removing the phosphorus slag from the charge, adding to the charge materials adapted to unite with sulfur to form a sulfur slag, removing the sulfur slag from the charge, adding metallic ore in the ratio of approximately forty pounds to the ton, causing ebullition in the charge, and withdrawing the charge from the furnace.

3. The process of producing steel which consists in charging a furnace with iron materials, adding to the charge dehydrated lime and carbon to unite with the phosphorus in the production of a phosphorus slag, removing the slag, adding to the charge fluor-spar and dehydrated lime to produce a carbid slag and effect the removal of sulfur, removing the slag, adding metallic ore to the charge, causing ebullition in the charge, and withdrawing the charge from the furnace.

4. The process of producing steel which consists in charging a furnace with iron materials, adding to the charge dehydrated lime and carbon to unite with the phosphorus in the production of a phosphorus slag, removing the slag, adding to the charge fluor-spar and dehydrated lime to produce a carbid slag and effect the removal of sulfur, removing the slag, adding metallic ore in the ratio of approximately forty pounds to the ton, causing ebullition in the charge, and withdrawing the charge from the furnace.

5. The process of producing steel which consists in charging a furnace with materials in the ratio of two thousand pounds of iron materials, adding to the charge approximately one hundred pounds of dehydrated lime and one hundred pounds of carbon, applying heat to reduce the charge, and producing a slag containing phosphorus, withdrawing the slag, adding approximately ten pounds of powdered fluor-spar to the charge, adding approximately ten pounds of dehydrated lime to the charge to produce a carbid slag and remove the sulfur, removing the slag, and thereafter adding approximately forty pounds of metallic ore, poling the mass and producing ebullition, allowing the metal to subside, and thereafter withdrawing the metal from the furnace.

EDWARD T. PELTON.